United States Patent
Mendonsa et al.

(10) Patent No.: US 12,116,689 B2
(45) Date of Patent: Oct. 15, 2024

(54) SELECTIVE SCREEN ELECTROPLATING

(71) Applicant: Seagate Technology LLC, Fremont, CA (US)

(72) Inventors: Riyan Alex Mendonsa, Minneapolis, MN (US); Brett R. Herdendorf, Mound, MN (US); Paul S. Tyler, Shakopee, MN (US)

(73) Assignee: Seagate Technology LLC, Fremont, CA (US)

( * ) Notice: Subject to any disclaimer, the term of this patent is extended or adjusted under 35 U.S.C. 154(b) by 239 days.

(21) Appl. No.: 17/158,962

(22) Filed: Jan. 26, 2021

(65) Prior Publication Data

US 2022/0235481 A1    Jul. 28, 2022

(51) Int. Cl.
| | |
|---|---|
| *C25D 5/02* | (2006.01) |
| *B33Y 10/00* | (2015.01) |
| *B33Y 30/00* | (2015.01) |
| *B33Y 50/02* | (2015.01) |
| *B33Y 80/00* | (2015.01) |

(Continued)

(52) U.S. Cl.
CPC ............ *C25D 5/02* (2013.01); *B33Y 10/00* (2014.12); *B33Y 30/00* (2014.12); *B33Y 50/02* (2014.12); *B33Y 80/00* (2014.12); *C25D 17/10* (2013.01); *C25D 21/12* (2013.01)

(58) Field of Classification Search
None
See application file for complete search history.

(56) References Cited

U.S. PATENT DOCUMENTS 3,240,685 A * 3/1966 Maissel ............... H01C 17/262
                                                          205/333
5,641,391 A    6/1997 Hunter et al.
(Continued)

FOREIGN PATENT DOCUMENTS

WO    2019150362 A1    8/2019

OTHER PUBLICATIONS

Reddy, K. Sai Madhukar et al., "Electrochemical Synthesis of Magnetostrictive Fe-Ga/Cu Multilayered Nanowire Arrays with Tailored Magnetic Response," Advanced Functional Materials 21 4677 (2011).

(Continued)

*Primary Examiner* — Stefanie S Wittenberg
(74) *Attorney, Agent, or Firm* — HOLZER PATEL DRENNAN

(57) ABSTRACT

The slow speed of conventional selective electroplating and L-PED (and further requirement of a series of masks in the case of selective electroplating) necessary to generate a metallic three-dimensional object makes conventional selective electroplating and L-PED not viable for mass manufacturing metallic three-dimensional objects. The presently disclosed technology generally utilizes electroplating and L-PED technologies with a screen electroplating process. The screen electroplating process disclosed herein is capable of achieving a faster throughput and a lower workpiece temperature than traditional 3D printing processes can provide, particularly traditional metal 3D printing processes. As a result, the presently disclosed screen electroplating process is able to achieve much faster results in printing a complex three-dimensional metallic structure using electroplating.

15 Claims, 4 Drawing Sheets

(51) Int. Cl.
   *C25D 17/10*  (2006.01)
   *C25D 21/12*  (2006.01)

(56) References Cited

U.S. PATENT DOCUMENTS

| | | | |
|---|---|---|---|
| 6,536,346 B2* | 3/2003 | Niestrath | B41J 3/4071 |
| | | | 347/112 |
| 6,962,782 B1* | 11/2005 | Livache | B01J 19/0046 |
| | | | 435/7.1 |
| 7,001,498 B2 | 2/2006 | Colgan et al. | |
| 7,049,007 B2 | 5/2006 | Gales et al. | |
| 7,955,486 B2 | 6/2011 | Yu et al. | |
| 2004/0094427 A1* | 5/2004 | Economikos | H01L 21/7684 |
| | | | 257/E21.175 |
| 2005/0255581 A1 | 11/2005 | Kim et al. | |
| 2007/0089993 A1* | 4/2007 | Schwartz | B33Y 30/00 |
| | | | 204/224 R |
| 2007/0221504 A1* | 9/2007 | Luo | C25D 21/14 |
| | | | 205/118 |
| 2009/0000364 A1* | 1/2009 | Yu | C25D 17/00 |
| | | | 204/229.8 |
| 2009/0183992 A1* | 7/2009 | Fredenberg | C25D 7/123 |
| | | | 205/120 |
| 2013/0098769 A1* | 4/2013 | Iwatsu | H01L 25/0657 |
| | | | 204/229.8 |
| 2014/0054176 A1* | 2/2014 | Stoimenov | C25D 5/02 |
| | | | 204/267 |
| 2017/0044680 A1 | 2/2017 | Sundaram | |
| 2017/0145584 A1 | 5/2017 | Wirth et al. | |
| 2021/0102286 A1* | 4/2021 | Pain | C25D 1/00 |

OTHER PUBLICATIONS

Braun, Trevor M. and Schwartz, Daniel T., "The Emerging Role of Electrodeposition in Additive Manufacturing", The Electrochemical Society Interface; Spring 2016.

* cited by examiner

SELECTIVE SCREEN ELECTROPLATING

BACKGROUND

Electroplating (also referred to as electrodeposition) encompasses a variety of processes that create a metal coating on a solid substrate through the reduction of cations of that metal using a direct electric current. Three-dimensional (3D) printing (also referred to herein as additive manufacturing (AM)) refers to the construction of a 3D object from a computer-aided design (CAD) generated or otherwise obtained digital 3D model.

Selective electroplating utilizes a mask to selectively apply a layer of metal on specific areas of the solid substrate. A successive series of selective electroplating processes, each using the same or different masks may be used to iteratively build a metallic three-dimensional object, which may be considered an example of a 3D printing process. Another example 3D printing process is localized pulsed electrodeposition (L-PED), which is a technique for directly printing metallic structures at the tip of an electrolyte containing nozzle. L-PED conceptually utilizes traditional electroplating; however, the area of deposition is defined by the size of a liquid bridge (or meniscus) formed between the nozzle tip and a substrate onto which the metallic structures are printed.

While selective electroplating is capable of creating complex three-dimensional objects, application of each electroplating layer is relatively slow, particularly when a new mask is needed for the next electroplating layer (e.g., selective electroplating requires many iterations of multiple complex steps (mask, electroplate, polish, and remove mask) to generate a single part). L-PED is also capable of creating complex three-dimensional objects; however, L-PED is also relatively slow as the nozzle is moved and selectively actuated to produce individual micro-scale or nano-scale metallic structures one layer at a time.

The slow speed of conventional selective electroplating and L-PED (and further requirement of a series of masks in the case of selective electroplating) necessary to generate a metallic three-dimensional object makes conventional selective electroplating and L-PED not viable for mass manufacturing metallic three-dimensional objects. A faster and cost competitive option for mass manufacturing metallic three-dimensional objects without expensive tooling required by conventional metal manufacturing processes (e.g., molding, forcing, extrusion, etc.) would be generally advantageous.

SUMMARY

Implementations of the presently disclosed technology provide a selective screen electroplating process comprising orienting a switched array of regularly spaced electrodes occupying pores within a screen parallel to and in close proximity to a substrate within an electrolyte bath, and selectively activating a subset of the electrodes to print a pattern of metal through the electrolyte bath on the substrate.

Implementations of the presently disclosed technology further provide a selective screen electroplating system comprising a bath containing an electrolyte, a substrate, a screen, and a switched array of regularly spaced electrodes occupying the pores within the screen. The screen is oriented parallel to and in close proximity to the substrate within the bath. The selective screen electroplating system further comprises an electroplating power controller to selectively activate a subset of the electrodes to print a pattern of metal through the electrolyte bath on the substrate.

Implementations of the presently disclosed technology still further provide one or more computer-readable storage media encoding computer-executable instructions for executing on a computer system a selective screen electroplating process.

Other implementations are also described and recited herein.

BRIEF DESCRIPTIONS OF THE DRAWINGS

DETAILED DESCRIPTIONS

The presently disclosed technology generally utilizes electroplating and L-PED technologies, but further utilizes a porous electroplating screen to accelerate manufacturing as described in further detail below. As a result, the presently disclosed selective screen electroplating processes are able to achieve much faster results in printing a complex metallic 3D structure using electroplating.

3D printing encompasses a variety of processes in which material is deposited and joined or solidified under computer control to create a 3D object, with material being added together (traditionally, liquid molecules or powder grains being fused together) iteratively, typically layer by layer. 3D printing generally provides a capability to produce complex shapes or geometries that would be otherwise difficult or impossible to construct using conventional manufacturing techniques (e.g., molding, forcing, extrusion, etc.). Traditionally, 3D printing utilizes polymers for printing, due to the ease of manufacturing and handling polymeric materials. However, traditional 3D printing has evolved to not only print various polymers but also metals.

Selective laser melting (SLM), also referred to herein as direct metal laser melting (DMLM) or laser powder bed fusion (LPBF), is a 3D printing technique that utilizes a high power-density laser to melt and fuse metallic powders together. Generally, thin layers of atomized fine metal powder, each representing a 2D slice of a part geometry, are evenly distributed using a coating mechanism onto a substrate. Once each layer has been distributed, each 2D slice of the part geometry is fused by selectively melting the powder together.

Traditional 3D printing processes, including SLM, have several drawbacks when compared to conventional manufacturing processes. For example, traditional 3D printing processes generally operate at a slow speed (e.g., SLM requires many iterations of multiple complex steps (print, bake, and wash) to generate a single part). Further, when used to print a metal object, traditional 3D printing processes generally operate at a high temperature (e.g., a temperature sufficient to melt layers of the metal three-dimensional object together), which can cause warping of heat-sensitive parts. As noted above, electroplating, including the screen electroplating processes disclosed herein, may be considered 3D metal printing processes as well, but the selective screen electroplating processes disclosed herein are capable of achieving a faster throughput and a lower workpiece temperature than traditional 3D printing processes can provide, particularly traditional metal 3D printing processes.

Figure 1:
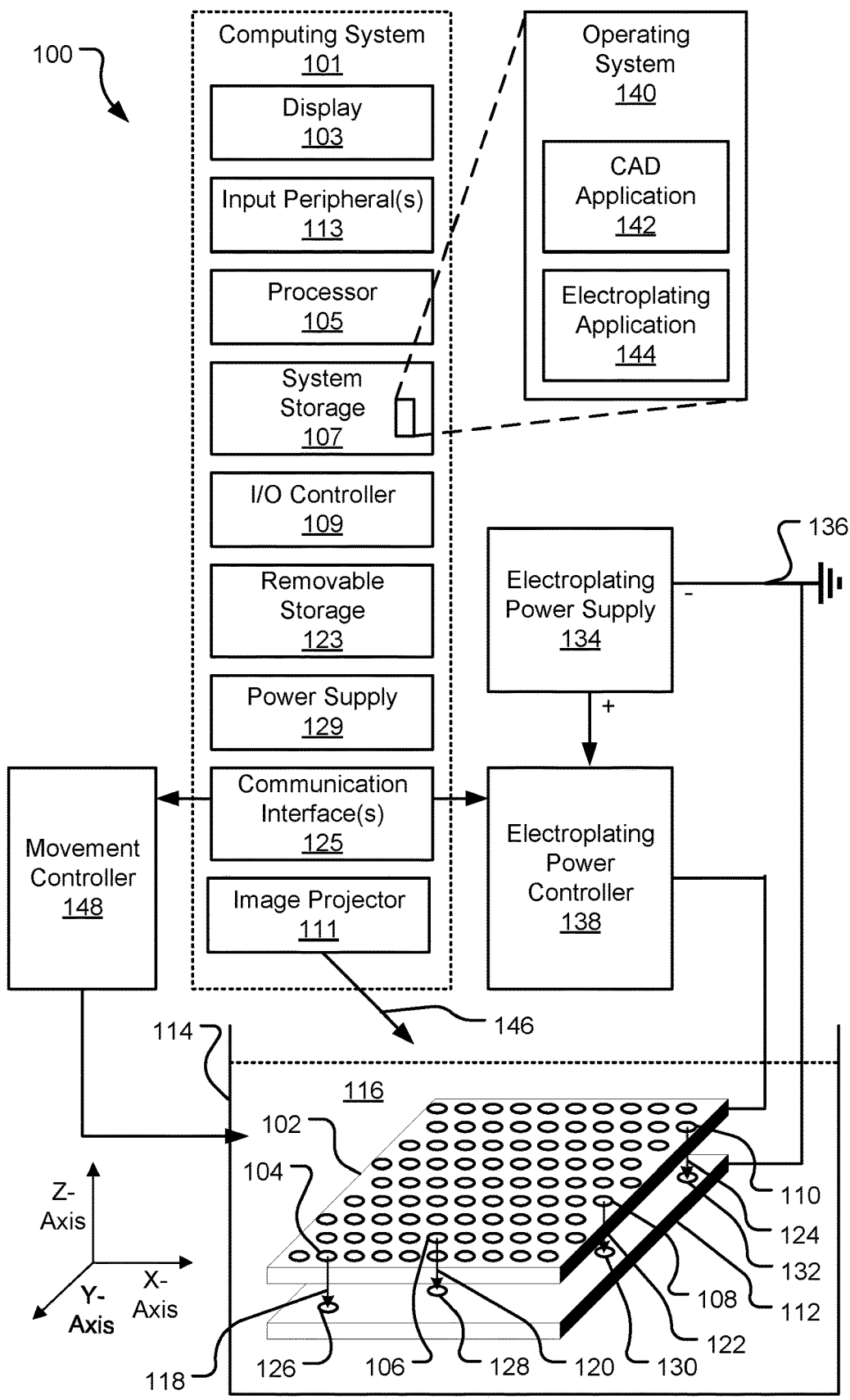
FIG. 1 illustrates an example selective screen electroplating system.

FIG. 1 illustrates an example selective screen electroplating system 100. The system includes a porous screen 102 that includes an array of regularly spaced electrodes (e.g., electrodes 104, 106, 108, 110) oriented in the pores. The screen 102 is arranged parallel and in close proximity to a solid substrate 112 onto which a metallic 3D structure is to be created. At least one side of the screen 102, as well as the substrate 112 are submerged in a bath 114 containing an electrolyte 116, which includes a salt of a metal to be coated on the substrate 112 (referred to herein as a printing metal). In operation, the substrate 112 acts as a cathode (or negative electrode) and the individual electrodes selectively act as anodes (or positive electrodes), which when combined with current provided by an electroplating power supply 134, forms an electrolytic cell for printing metal on the substrate 112.

In some implementations, the polarity of the system 100 may be selectively reversed to remove metal, rather than add metal to the substrate 112. More specifically, the substrate 112 acts as an anode and the individual electrodes selectively act as cathodes when the polarity is reversed, which when combined with current provided by the electroplating power supply 134, ionizes a pattern of metal from the substrate 112 through the electrolyte 116.

In one example, the electrodes may be formed from the printing metal. For example, the electrolyte 116 for forming a copper 3D structure can be a solution of copper(II) sulphate, which dissociates into $Cu^{2+}$ cations and $SO_4^{2-}$ anions. At the substrate 112 (cathode), the $Cu^{2+}$ is reduced to metallic copper by gaining two electrons. When the electrodes (anodes) are made of the coating metal and active, the opposite reaction may occur, turning the electrodes into dissolved cations within the electrolyte 116. The copper oxidizes at active electrodes (anodes) to $Cu^{2+}$ by losing two electrons. The rate at which the active electrodes (anodes) are dissolved will be approximately equal to the rate at which the substrate 112 (cathode) is plated and thus the ions in the electrolyte 116 are continuously replenished by the active electrodes (anodes). The net result is the effective transfer of metal from the active electrodes (anodes) to the substrate 112 (cathode).

In another example, the electrodes may be formed from another relatively inert conductive material. For example, the electrodes may be made of a material that resists electrochemical oxidation to prolong the life of the screen 102, such as lead or carbon. If the electrodes are made of a conductive material other than the printing metal, ions of the printing metal may be periodically replenished in the bath 114 as they are drawn out of the electrolyte 116. In sum, the pattern of metal is printed from material obtained from one or both of the electrolyte 116 and the electrodes, one or both of which is referred to herein as printing the pattern of metal through the electrolyte 116. In some implementations, the electrodes may be made of different metals across the screen 102. In an implementation where the pattern of metal is printed from material obtained from the electrodes, electrodes made of different metals may enable the system 100 to print the metallic 3D structure with different metals in different regions of the metallic 3D structure.

In some implementations, the electrodes may be charged (or coated) with the printing metal before performing the disclosed screen electroplating process. For example, the electrodes may be charged by reversing the aforementioned process and making the electrodes the cathode and a source material the anode for charging. This charging process may be performed at regular intervals to replenish the printing metal coated on the electrodes. Further, a subset of the electrodes may be connected as cathodes to selectively charge the subset of electrodes to the exclusion of the remaining electrodes. Selective charging of a subset of electrodes may also allow for using different printing metals on different electrodes, which can later yield the printed metallic 3D structure made of different printing metals depending on which electrodes were used and their respective X-Y coordinates when performing the disclosed screen electroplating process.

Further, the electrolyte 116 may be replenished with printing metal using a 2-chamber process, where one chamber contains the porous screen 102 and the substrate 112 and a second chamber contains a charging material including the printing metal. The electrolyte 116 is then cycled through both of the chambers to continuously both deplete and recharge the printing metal within the electrolyte 116.

The screen 102 may be made of any electrically insulating material effective at physically and electrically isolating the electrodes from one another. The substrate 112 is generally made of another inert conductive material suitable for receiving the printing metal and in some implementations, facilitating a later separation of the metallic 3D structure from the substrate 112 (e.g., lead or carbon). As mentioned above, the electrolyte 116 contains positive ions (or cations) of the printing metal. The cations are selectively reduced at the substrate 112 cathode to the metal in a zero-valence state depending on which of the electrodes are active. The printing metal may be a single metallic element or an alloy. While some alloys can be electrodeposited, (e.g., brass and solder), electrodeposited alloys are not true alloys (i.e., solid solutions), but rather discrete tiny crystals of the constituent metallic elements being deposited on the substrate 112. In some implementations, it is desirable to have a true alloy rather than an as-deposited alloy if the true alloy has superior qualities (e.g., a true alloy of solder is more corrosion resistant than its as-plated alloy). To form a true alloy, the as-plated alloy may be melted together in a processing step subsequent to forming the metallic 3D structure using the system 100.

As an example, electrodes 104, 106, 108, 110 are illustrated as active in FIG. 1. Arrows 118, 120, 122, 124 illustrate localized reductions of the cations through the electrolyte 116 on the substrate 112, which results in localized deposits 126, 128, 130, 132 of the metal on the substrate 112, respectively. Each of the localized deposits 126, 128, 130, 132 are caused by corresponding active electrodes 104, 106, 108, 110, respectively. In sum and over time, the illustrated localized deposits 126, 128, 130, 132, as well as additional localized deposits make up the metallic 3D structure.

As discussed above, the substrate 112 acts as a cathode and the individual electrodes selectively act as anodes, which when combined with current provided by the electroplating power supply 134, forms an electrolytic cell. In the example depicted in FIG. 1, the substrate 112 and a negative lead from the electroplating power supply 134 are connected to a common ground 136. A positive lead from the electroplating power supply 134 is connected to an electroplating power controller 138. The electroplating power controller 138 is connected to each of the electrodes within the screen 102 and is capable of selecting which of the electrodes are active (or connected to the electroplating power supply 134) at any given moment in time. In the example of FIG. 1, the electrodes 104, 106, 108, 110 are made active by the electroplating power controller 138 by connecting the electrodes 104, 106, 108, 110 to the electroplating power supply 134 to the exclusion of the remaining electrodes in the screen 102. In this manner of operation, the regularly spaced electrodes within the screen 102 may be considered a switched array.

The electroplating power controller 138 is controlled by a computing system 101. The computing system 101 includes major subsystems such as a processor 105, system storage 107 (such as random-access memory (RAM) and read-only memory (ROM)), an input/output (I/O) controller 109, removable storage 123 (such as a memory card), a power supply 129, and external devices such as a display screen 103 and an image projector 111, and various input peripherals 113 (e.g., a mouse, trackpad, keyboard, stylus, and a touchscreen). Communication interfaces 125 (wireless and/or wired) may be used to interface the computing system 101 with the electroplating power controller 138, a data storage network and/or a local or wide area network (such as the Internet) using any network interface system known to those skilled in the art.

Other devices or subsystems (not shown) may be connected in a similar manner to the electroplating power controller 138 (e.g., servers, personal computers, tablet computers, smart phones, mobile devices, etc.). It is also not necessary for all of the components of the computing system 101 depicted in FIG. 1 to be present to practice the presently disclosed technology. Furthermore, devices and components thereof may be interconnected in different ways from that shown in FIG. 1. Code (e.g., computer software, including an operating system (e.g., operating system 140) and various applications (e.g., computer-aided design (CAD) application 142 and electroplating application 144) implement the presently disclosed technology and may be operably disposed in the system storage 107 and/or the removable storage 123.

The operating system 140 controls numerous applications, including for example, the CAD application 142 (e.g., SolidWorks). The CAD application 142 may be used to generate a digital 3D model of the metallic 3D structure to be created. In some cases, the CAD application 142 is omitted from the operating system 140 and a file containing the digital 3D model is generated from a 3D scan of an object to be reproduced. The digital 3D model may also be otherwise obtained from an outside source. The digital 3D model is stored in a format usable for a 3D printing process, such as stereolithography file format (STL) or additive manufacturing file format (AMF).

The operating system 140 may further include an electroplating application 144, which is used to instruct the electroplating power controller 138 which of the electrodes to activate (or be connected to the electroplating power supply 134) at any given moment in time. In an example implementation, the CAD application 142 and/or the electroplating application 144 operates as a "slicer" in dividing the digital 3D model of the metallic 3D structure to be into a series of 2D layers and may output a G-code file specific to the system 100. The G-code file maps each of the 2D layers to the electrodes in the screen 102 and each of the electrodes are assigned an ON (active) or OFF (inactive) state for printing each 2D layer. The electroplating application 144 then instructs the electroplating power controller 138 via the communication interfaces 125 of the computing system 101 to set the appropriate electrodes assigned an ON state for a current 2D layer to be printed.

The electroplating application 144 may further define the duration that each of the electrodes assigned the ON state are to be active based on a desired height of the current 2D layer. The electroplating application 144 further loads subsequent 2D layers and outputs their assigned electrodes with an ON state to the electroplating power controller 138 to iteratively build the metallic 3D structure layer-by-layer.

In some implementations, the electroplating application 144 is capable of a non-binary use of the electrodes (e.g., the electroplating application 144 is capable of additional partially ON states between a completely OFF state and a completely ON state). For further example, the electroplating application 144 may be capable of applying different power levels to the electrodes, pulsing the electrodes at different frequencies at a given power level, and/or using a combination of power levels and frequencies to achieve the non-binary use of the electrodes. Non-binary use of the electrodes gives the electroplating application 144 additional control over rate of printing metal deposition, resolution, and accuracy as well as the structure and density of the printing metal deposited. In other words, non-binary use of the electrodes yields effects on printing rate and resolution as well as physical properties of the deposited printing metal.

In another example implementation, the electroplating application 144 utilizes the image projector 111 to project an image of a current to-be-printed 2D layer onto the screen 102, as illustrated by arrow 146. Here, each of the electrodes (or commonly controlled groupings of electrodes) are equipped with a photosensor that defines their ON/OFF state. The projected image then controls the ON/OFF state of the electrodes in place of the electroplating power controller 138.

The computing system 101 may include a variety of tangible computer-readable storage media (e.g., the system storage 107 and/or the removable storage 123) and intangible computer-readable communication signals. Tangible computer-readable storage can be embodied by any available media that can be accessed by the computing system 101 and includes both volatile and non-volatile storage media, as well as removable and non-removable storage media implemented in any method or technology for storage of information such as computer readable instructions, data structures, program modules, and/or other data. Tangible computer-readable storage media includes, but is not limited to, firmware, RAM, ROM, electrically erasable programmable read-only memory (EEPROM), flash or other memory technology, optical disc storage, magnetic cassettes, magnetic tape, magnetic disc storage or other magnetic storage devices, and any other tangible medium which can be used to store information, and which can be accessed by the computing system 101.

Intangible computer-readable communication signals may embody computer readable instructions, data structures, program modules, or other data resident in a modulated data signal, such as a carrier wave or other signal transport mechanism. A "modulated data signal" is a signal that has one or more of its characteristics set or changed in such a manner as to encode information within the signal. By way of example, and not limitation, intangible communication signals include signals traveling through wired media such as a wired network or direct-wired connection, and wireless media such as acoustic, radio frequency (RF), infrared (IR), and other wireless media. Computer-readable storage media as defined herein specifically excludes intangible computer-readable communications signals.

Some implementations may comprise an article of manufacture which may comprise a tangible storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (APIs), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described implementations. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain operation segment. The instructions may be implemented using any suitable high-level, low-level, object-oriented, visual, compiled and/or interpreted programming language.

The metallic 3D structure to be created may be of any shape, size, and purpose. For example, the metallic 3D structure may be printed on a circuit board substrate to create a printed circuit board (PCB) (e.g., a nickel 3D structure printed on a copper circuit board substrate). The PCB also may be of phenolic paper, fiberglass, aluminum, or a flexible foil substrate, for example. In some implementations, an adhesion and/or conduction promoter is applied on the substrate prior to printing metallic 3D structure on the substrate 112. For example, a conductive paint may be coated on the substrate 112 and then the metallic 3D structure is applied over the painted substrate 112. More specifically, the substrate 112 could be first printed with an adhesion and/or conduction promoting ink and then the metallic 3D structure is printed above the adhesion and/or conduction promoting ink.

The metallic 3D structure may further be a flexible cable, a component of a micro-electromechanical system (MEMS), or a micro-structural component (e.g., honeycomb, webbing, etc.), for example. The metallic 3D structure may further be a solid structure printed with air gaps to reduce density (a printed foam, e.g., with 70-80% solid content). Still further, the metallic 3D structure may be intended to be separated from the substrate 112 once the metallic 3D structure is complete, or conversely may be intended to remain a permanent fixture on the substrate 112.

A lower limit on overall size (and discrete feature reproduction) of the metallic 3D structure is defined in part by the screen 102 resolution. Akin to pixel resolution in digital imaging, the number of electrodes within the screen, spacing between the individual electrodes, and their associated printing area in part defines the electrode resolution of the system 100. Layer thickness further defines the electrode resolution of the system 100. X-Y (planar) resolution may be expressed in dots per inch (DPI) or micrometers (μm) and layer thickness (Z-direction) may be expressed in micrometers (μm). In an example implementation, a minimum Z-direction layer thickness is approximately (+/−10%) 2 μm (1,600 DPI). Further, X-Y resolution of the screen 102 may be 50 to 100 μm (510 to 250 DPI). In one example implementation, the system 100 may be capable of printing variable thicknesses (e.g., 2 μm-10 μm layers) of metal on the substrate 102 as the metallic 3D structure is printed, as defined by the electroplating application 144.

In a further example implementation, the electrodes within the screen 102 may be nanopores (i.e., pores having a diameter less than 20 nm) in scale. Nanopore electrodes theoretically have an extremely high X-Y (planar) resolution, however, the nanopore electrodes may not be individually switched between ON (active) or OFF (inactive) states for printing. In this case, groupings of nanopore electrodes within an area are switched, thus the switched area defines the X-Y (planar) resolution of the nanopore electrode screen 102. Further, electrodes of a larger scale than the nanopore electrodes may also be arranged in groupings. In both cases, selectively activating a subset of the electrodes includes activating one or more of the switched electrode groupings rather than the individual electrodes.

In a still further implementation, the screen 102 is substantially smaller than the substrate 112 and the metallic 3D structure to be printed thereon. As a result, the screen 102 is moved laterally (within the X-Y plane) to an area of the substrate 112 to be printed using a movement controller 148 while the substrate 112 remains in a fixed position. In an example implementation, the screen 102 is repeatedly reoriented in the X-Y plane to fully cover an area to be occupied by the metallic 3D structure to be printed. In another implementation, the screen 102 is sufficiently large in one of the X-direction and the Y-direction and the screen 102 is only reoriented in the other of the X-direction and the Y-direction to fully cover an area to be occupied by the metallic 3D structure to be printed. For example, the screen 102 may cover several full rows (X-direction) of printing capacity and the movement controller 148 moves the screen 102 up/down columns (Y-direction) only to fully cover an area to be occupied by the metallic 3D structure to be printed. In various implementations, the substrate 112 is instead moved while the screen 102 remains in a fixed position or both the substrate 112 and the screen 102 are moveable to achieve the foregoing.

In various implementations, one or both of the screen 102 and the substrate 112 may be moved in the Z-direction to achieve and maintain a desired screen 102/substrate 112 spacing for electrodeposition (e.g., 5-15 millimeters), which is referred to herein as close proximity. Movement of one or both of the substrate 112 and the screen 102 in one or more of the X-direction, Y-direction, and/or Z-direction using the movement controller 148 is referred to herein as re-orienting the screen above an area of the substrate 112 to the printed. Movement exclusively in the X-Y plane is referred to herein as laterally re-orienting the screen 102.

Figure 2A:
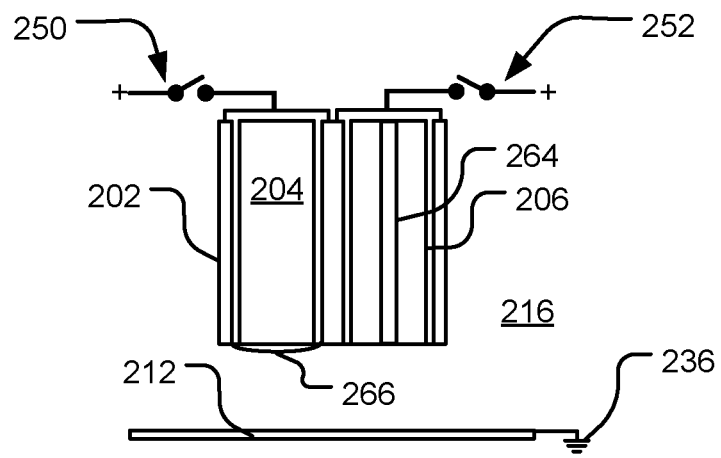
FIG. 2A illustrates an example pair of electrodes within a screen, each in an OFF state.

FIG. 2A illustrates an example pair of electrodes 204, 206 within a screen 202, each in an OFF (or inactive) state. The electrodes 204, 206 are an example two of an array of two or more regularly spaced electrodes oriented in and filling respective pores within the screen 202. The screen 202 is arranged parallel and in close proximity to a solid substrate 212 onto which a metallic 3D structure is to be created. At least a side of the screen 202 facing the substrate 212, as well as a side of the substrate 212 facing the screen 202 are submerged in a bath containing an electrolyte 216, which includes a salt of a metal to be coated on the substrate 212 (referred to herein as a printing metal).

In operation, the substrate 212 acts as a cathode (or negative electrode) and the electrodes 204, 206 selectively act as anodes (or positive electrodes), which when combined with current provided by an electroplating power supply (not shown, see e.g., electroplating power supply 134 of FIG. 1), forms an electrolytic cell for printing metal and/or ionic compounds on the substrate 212. More specifically, the substrate 212 and a negative lead from the electroplating power supply are connected to a common ground 236. A positive lead from the electroplating power supply is connected to an electroplating power controller (illustrated in FIG. 2A-C as circuits 250, 252). The electroplating power controller is connected to each of the electrodes 204, 206 and is capable of selecting which of the electrodes 204, 206 are active (illustrated as circuits 250, 252 moved from an OPEN state to a CLOSED state) at any given moment in time. As both circuits 250, 252 are illustrated in an OPEN state in FIG. 2A, each corresponding one of the electrodes 204, 206 is in an OFF (or inactive) state.

Figure 2B:
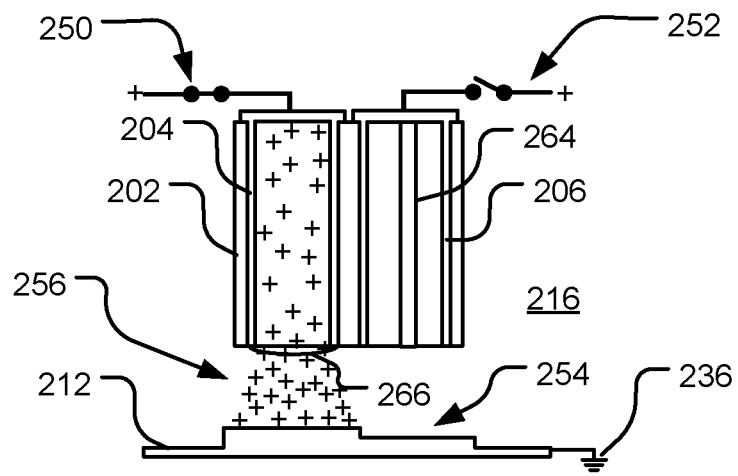
FIG. 2B illustrates the example pair of electrodes of FIG. 2A, with one of the electrodes in an OFF state and the other of the electrodes in an ON state.
Figure 2C:
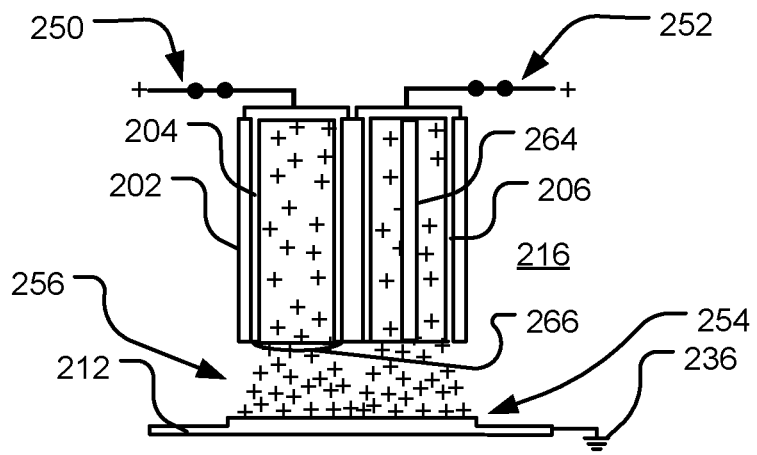
FIG. 2C illustrates the example pair of electrodes of FIG. 2A, with both of the electrodes in an ON state.

FIG. 2B illustrates the example pair of electrodes 204, 206 of FIG. 2A, with electrode 206 in an OFF (or inactive) state and electrode 204 in an ON (or active) state. As circuit 250 is illustrated in a CLOSED state in FIG. 2B, the corresponding ON electrode 204 is illustrated as actively printing metal on the substrate 212. FIG. 2C illustrates the example pair of electrodes 204, 206 of FIG. 2A, with both of the electrodes 204, 206 in an ON (or active) state. As both circuits 250, 252 are illustrated in a CLOSED state in FIG. 2C, both ON electrodes 204, 206 are illustrated as actively printing metal on the substrate 212.

The substrate 212 is generally made of an inert conductive material suitable for receiving the printing metal. The electrolyte 216 contains cations 256 (illustrate as "+"s) of the printing metal. The cations 256 are selectively reduced at the substrate 212 cathode to the metal in a zero-valence state below the ON electrode(s). A pattern of metal 254 is printed from material obtained from one or both of the electrolyte 216 and the ON electrode(s), one or both of which is referred to herein as printing the pattern of metal 254 through the electrolyte 216. In sum and over time, multiple layers of the printed pattern of metal 254 on top of one another becomes the metallic 3D structure.

The electrode 204 is illustrated in FIGS. 2A-2C as a solid pin shaped electrode that fills a pore in the screen 202. In various implementations, to increase the surface area of electrode 204 in contact with the electrolyte 216, the electrode 204 may include a dimple 266 or other projection that extends below the screen 202, as an example. The electrode 206 is illustrated in FIGS. 2A-2C as a closed cylindrical liner of a pore in the screen 202. The electrolyte 216 fills an interior of the electrode 206 and the closed cylindrical liner shape provides more surface area of the electrode 206 in contact with the electrolyte 216 as compared to a similarly sized and shaped solid pin shaped electrode, such as the electrode 204.

In various implementations, to further increase the surface area of electrode 206 in contact with the electrolyte 216, a central pin 264 may extend through the middle of the electrode 206, as an example. In various implementations, the central pin 264 may also provide recharge metal for the electrolyte 216. Any combination of features to increase surface area of the electrodes in contact with the electrolyte 216 may be used as the increased surface area generally lowers current density applied at each electrode, which in turn reduces power demand on the electroplating power supply.

Figure 3:
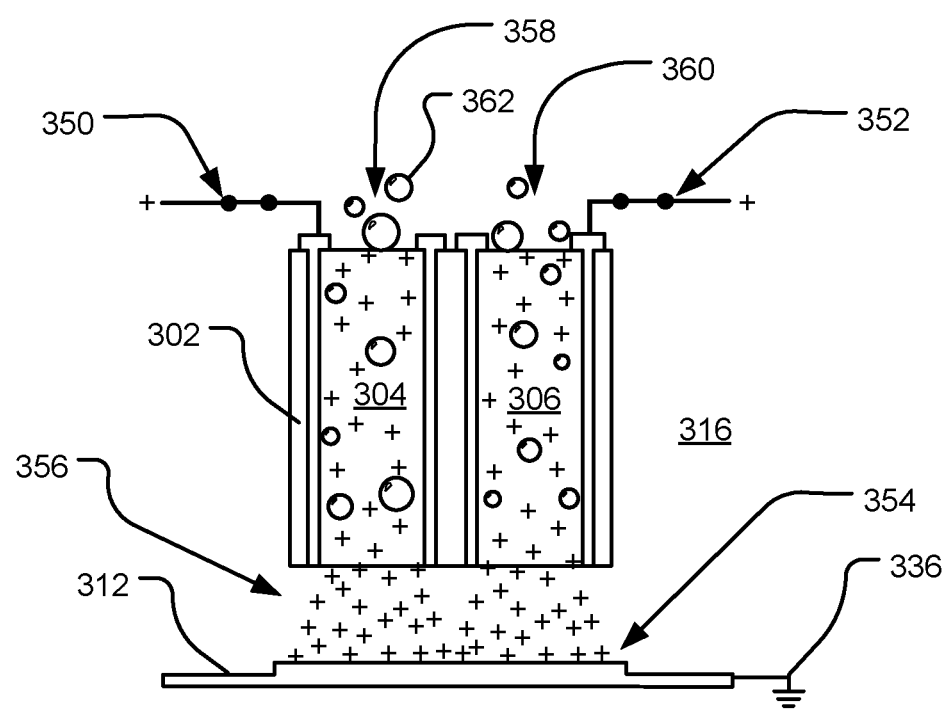
FIG. 3 illustrates an example pair of electrodes within a porous screen, the electrodes each having a venting through-hole.

FIG. 3 illustrates an example pair of electrodes 304, 306 within a porous screen 302, the electrodes 304, each having venting through-holes 358, 360, respectively. The electrodes 304, 306 are an example two of an array of two or more regularly spaced electrodes oriented in and filling respective pores within the screen 302. The screen 302 is arranged parallel and in close proximity to a solid substrate 312 onto which a metallic 3D structure is to be created. At least a side of the screen 302 facing the substrate 312, as well as a side of the substrate 312 facing the screen 302 are submerged in a bath containing an electrolyte 316, which includes a salt of a metal to be coated on the substrate 312 (referred to herein as a printing metal).

In operation, the substrate 312 acts as a cathode (or negative electrode) and the electrodes 304, 206 selectively act as anodes (or positive electrodes), which when combined with current provided by an electroplating power supply (not shown, see e.g., electroplating power supply 134 of FIG. 1), forms an electrolytic cell for printing metal on the substrate 312. More specifically, the substrate 312 and a negative lead from the electroplating power supply are connected to a common ground 336. A positive lead from the electroplating power supply is connected to an electroplating power controller (illustrated as circuits 350, 352). The electroplating power controller is connected to each of the electrodes 304, 306 and is capable of selecting which of the electrodes 304, 306 are active at any given moment in time. As both circuits 350, 352 are illustrated in a CLOSED state in FIG. 3, both ON electrodes 304, 306 are illustrated as actively printing metal on the substrate 312.

The substrate 312 is generally made of an inert conductive material, with or without an adhesion and/or conduction promoting coating, suitable for receiving the printing metal. The electrolyte 316 contains cations 356 (illustrate as "+"s) of the printing metal. The cations 356 are selectively reduced at the substrate 312 cathode to the metal in a zero-valence state below the ON electrodes 304, 306. A pattern of metal 354 is printed from material obtained from one or both of the electrolyte 316 and the electrode 304, one or both of which is referred to herein as printing the pattern of metal 354 through the electrolyte 316. In sum and over time, multiple layers of the printed pattern of metal 354 on top of one another becomes the metallic 3D structure.

The electrodes 304, 306 are illustrated in FIG. 3 as open cylindrical liners of pores in the screen 302. Accordingly, gasses generated within the electrolyte 316 may be vented through the screen 302 by venting through the through-holes 358, 360, as illustrated by the depicted bubbles (e.g., bubble 362). The cylindrical liner shaped electrodes 304, 306 further provide more surface area of the electrodes 304, 306 in contact with the electrolyte 316 as compared to a similarly sized and shaped solid pin shaped electrode.

In some implementations, the electrolyte bath is individually applied at each of the active electrodes rather than existing between all electrodes and the substrate 312 at all times. When an electrode is activated, the electrolyte 316 may be pumped through a through-hole in the electrode while the electrode is active. The electrolyte 316 may then be shut off from the electrode when the electrode is deactivated. In some implementations, selectively permitting flow of the electrolyte 316 (e.g., via valves connected to the electrodes) may be used to selectively activate the electrodes instead of or in additional to using selective application of power to the electrodes to selectively activate the electrodes.

Figure 4:
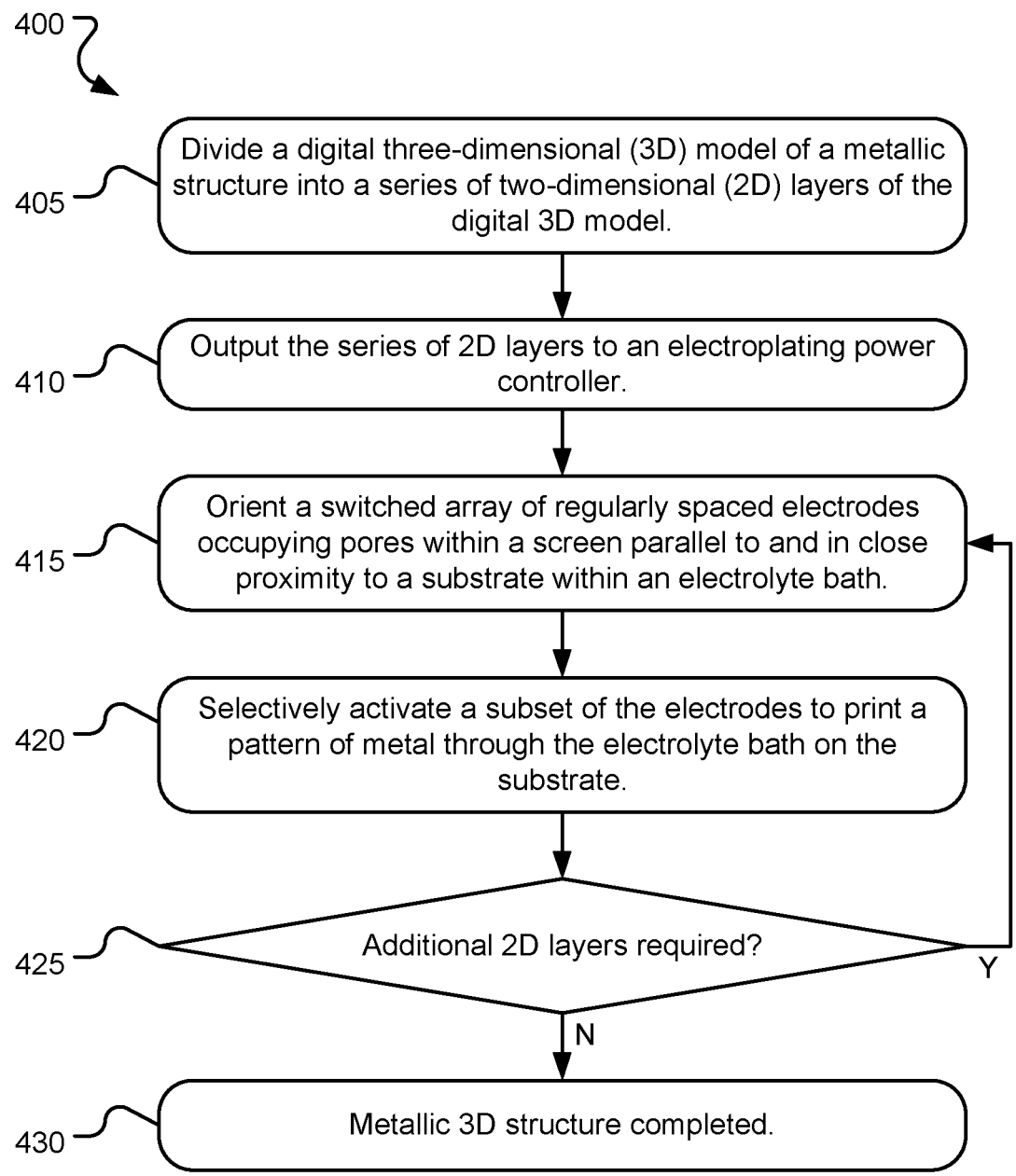
FIG. 4 illustrates example operations for manufacturing a metallic 3D structure using a selective screen electroplating process.

FIG. 4 illustrates example operations 400 for manufacturing a metallic 3D structure using a selective screen electroplating process. A dividing operation 405 divides a digital 3D model of a metallic structure into a series of 2D layers of the digital 3D model. The 3D model of a metallic structure may be obtained from a CAD drawing or a 3D scan of an object to be reproduced, for example. An outputting operation 410 outputs the series of 2D layers to an electroplating power controller sequentially. The electroplating power controller controls which electrodes within a switched array are selectively activated to print each of the series of 2D layers.

An orienting operation 415 orients a switched array of regularly spaced electrodes occupying pores within a screen parallel to and in close proximity to a substrate within an electrolyte bath. The orienting operation 415 may be achieved by moving one or both of the screen and the substrate in X, Y, and/or Z coordinate directions until the placement of the screen with respect to the substrate is correct for accurately applying a 2D layer of electroplating to the substrate. A selectively activating operation 420 selectively activates a subset of the electrodes to print a pattern of metal through the electrolyte bath on the substrate. The selectively activating operation 420 is a selective electroplating operation. The selectively activating operation 420 continues until a desired thickness of the 2D layer is achieved. As discussed above, the selectively activating operation 420 may apply printing metal to the entire substrate at once, or one or more lines of pixels of material at a time depending on the X-Y size of the selective screen as compared to the X-Y size of the metallic structure to be printed.

A decision operation 425 determines if additional 2D layers are required to complete the metallic 3D structure. If so, the orienting operation 415 repeats to re-orient the screen with respect to the substrate in X, Y, and/or Z coordinate directions until the placement of the screen with respect to the substrate is correct for accurately applying the next 2D layer of electroplating to the substrate. The selectively activating operation 420 repeats as well to selectively activate a potentially different subset of the electrodes to print a potentially different pattern of metal on the substrate. The decision operation 425 then repeats to determine if additional 2D layers are required to complete the metallic 3D structure. This process is iterated until all 2D layers making up the 3D model of the metallic structure have been electroplated on the substrate. Once no additional 2D layers are required, the metallic 3D structure is complete 430.

The presently disclosed technology may be implemented as logical steps in one or more computer systems (e.g., as a sequence of processor-implemented steps executing in one or more computer systems and as interconnected machine or circuit modules within one or more computer systems). The implementation is a matter of choice, dependent on the performance requirements of the computer system implementing the presently disclosed technology. Accordingly, the logical operations making up implementations of the presently disclosed technology are referred to variously as operations, steps, objects, or modules. Furthermore, it should be understood that logical operations may be performed in any order, adding or replacing operations as desired, unless explicitly claimed otherwise or a specific order is inherently necessitated by the claim language.

The above specification, examples, and data provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in yet another embodiment without departing from the recited claims.

What is claimed is:

1. A selective screen electroplating process comprising:
   submerging a switched array of regularly spaced electrodes extending through and filling pores within a screen parallel to and in close proximity to a substrate within an electrolyte bath, wherein the electrodes are closed cylindrical liners filled with electrolyte; and
   selectively activating a subset of the electrodes to print a pattern of metal through the electrolyte bath on the substrate.

2. The selective screen electroplating process of claim 1, further comprising:
   selectively activating a different subset of the electrodes to print a different pattern of metal through the electrolyte bath on top of one or more patterns of metal previously printed on the substrate.

3. The selective screen electroplating process of claim 2, wherein sequentially printing patterns of metal through the electrolyte bath on the substrate builds a three-dimensional metallic structure.

4. The selective screen electroplating process of claim 1, further comprising:
   dividing a digital three-dimensional (3D) model of a metallic structure into a series of two-dimensional (2D) layers of the digital 3D model; and
   outputting the series of 2D layers to an electroplating power controller, wherein the electrodes are selectively activated for each of the series of 2D layers.

5. The selective screen electroplating process of claim 4, wherein the series of 2D layers are output sequentially to the electroplating power controller, and wherein the electrodes are selectively activated responsive to the electroplating power controller receiving each of the series of 2D layers.

6. The selective screen electroplating process of claim 1, further comprising:
   dividing a digital three-dimensional (3D) model of a metallic structure into a series of two-dimensional (2D) layers of the digital 3D model; and
   projecting each of the series of 2D layers onto the screen sequentially, wherein the electrodes are equipped with photosensors that selectively activate a subset of the electrodes for each of the series of 2D layers.

7. The selective screen electroplating process of claim 1, wherein the pattern of metal is printed from one or more metals obtained from one or both of the electrolyte bath and the electrodes.

8. The selective screen electroplating process of claim 1, further comprising:
   selectively activating another subset of the electrodes with a reversed polarity to ionize another pattern of metal from the substrate through the electrolyte bath.

9. The selective screen electroplating process of claim 1, wherein the electrodes are arranged in two or more switched electrode groupings, and wherein the selectively activating a subset of the electrodes includes activating one or more of the switched electrode groupings.

10. The selective screen electroplating process of claim 1, further comprising:
    laterally re-orienting the screen above an area of the substrate to be printed to prior to selectively activating the subset of the electrodes.

11. The selective screen electroplating process of claim 1, wherein the regularly spaced electrodes occupy nanopores within the screen.

12. A selective screen electroplating system comprising:
a bath containing:
an electrolyte;
a substrate;
a screen containing an array of pores; and
a switched array of regularly spaced electrodes extending through and filling the pores within the screen, the screen oriented parallel to and in close proximity to the substrate within the bath, wherein the electrodes are closed cylindrical liners filled with the electrolyte and submerged within the bath; and
an electroplating power controller to selectively activate a subset of the electrodes to print a pattern of metal through the electrolyte on the substrate.

13. The selective screen electroplating system of claim 12, further comprising:
a computing system running an operating system, the operating system executing an electroplating application, the electroplating application to:
divide a digital three-dimensional (3D) model of a metallic structure into a series of two-dimensional (2D) layers of the digital 3D model; and
output the series of 2D layers to the electroplating power controller, wherein the electrodes are selectively activated for each of the series of 2D layers.

14. The selective screen electroplating system of claim 12, further comprising:
a computing system including an image projector and running an operating system, the operating system executing an electroplating application, the electroplating application to:
divide a digital three-dimensional (3D) model of a metallic structure into a series of two-dimensional (2D) layers of the digital 3D model; and
control the image projector to project each of the series of 2D layers onto the screen sequentially, wherein the electrodes are equipped with photosensors that selectively activate a subset of the electrodes for each of the series of 2D layers.

15. The selective screen electroplating system of claim 12, further comprising:
an electroplating power supply to provide power to the electroplating power controller.

* * * * *